United States Patent
Li et al.

(10) Patent No.: US 10,355,878 B2
(45) Date of Patent: Jul. 16, 2019

(54) METHOD FOR ESTABLISHING WIRELESS LOCAL AREA NETWORK TUNNEL, APPARATUS, AND ACCESS NETWORK SYSTEM

(71) Applicant: Huawei Technologies Co., Ltd., Shenzhen (CN)

(72) Inventors: Jin Li, Nanjing (CN); Jinwei Xia, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 15/248,958

(22) Filed: Aug. 26, 2016

(65) Prior Publication Data

US 2016/0373273 A1     Dec. 22, 2016

Related U.S. Application Data

(63) Continuation of application No. PCT/CN2015/072497, filed on Feb. 9, 2015.

(30) Foreign Application Priority Data

Feb. 28, 2014   (CN) .......................... 2014 1 0073210

(51) Int. Cl.
*H04W 4/00*     (2018.01)
*H04L 12/46*     (2006.01)
(Continued)

(52) U.S. Cl.
CPC ......... *H04L 12/4633* (2013.01); *H04W 76/12* (2018.02); *H04W 84/12* (2013.01)

(58) Field of Classification Search
None
See application file for complete search history.

(56) References Cited

U.S. PATENT DOCUMENTS

2004/0248557 A1* 12/2004 Muratsu ............. H04L 12/4641
                                                    455/411
2008/0089305 A1    4/2008 Yao et al.
(Continued)

FOREIGN PATENT DOCUMENTS

CN     101771612 A     7/2010
CN     102685725 A     9/2012
(Continued)

OTHER PUBLICATIONS

Chen et al., "CAPWAP Extension for 802.11n and Power/channel Autoconfiguration" OPSAWG, Internet Draft, pp. 1-17, IETF Trust, Reston, Virginia (Jul. 6, 2015).
(Continued)

*Primary Examiner* — Zewdu A Beyen
(74) *Attorney, Agent, or Firm* — Leydig, Voit & Mayer, Ltd.

(57) ABSTRACT

The embodiments of the invention provide a method for establishing a wireless local area network tunnel, an apparatus, and an access network system. An AC sends a first configuration message to an AP, where the first configuration message includes a first tunnel establishment configuration parameter, and the first tunnel establishment configuration parameter includes information about binding between an IP address of at least one BRAS and at least one SSID, so that the AP establishes a data tunnel with the BRAS according to the first tunnel establishment configuration parameter, and the AC establishes a control tunnel with the AP, thereby separating the data tunnel from the control tunnel, and reducing unnecessary overheads of the AC.

14 Claims, 5 Drawing Sheets

(51) Int. Cl.
*H04W 76/12* (2018.01)
*H04W 84/12* (2009.01)

(56) References Cited

U.S. PATENT DOCUMENTS

| | | | |
|---|---|---|---|
| 2008/0130661 A1* | 6/2008 | Jiang | H04L 12/18 370/401 |
| 2009/0129386 A1* | 5/2009 | Rune | H04L 12/2881 370/392 |
| 2009/0213860 A1* | 8/2009 | Liu | H04L 12/2859 370/395.53 |
| 2011/0103344 A1 | 5/2011 | Gundavelli et al. | |
| 2016/0143071 A1 | 5/2016 | Wang | |

FOREIGN PATENT DOCUMENTS

| | | |
|---|---|---|
| CN | 103220650 A | 7/2013 |
| EP | 2469961 A1 | 6/2012 |
| EP | 2544472 A1 | 1/2013 |

OTHER PUBLICATIONS

"Public Wi-Fi Access in Multi-service Broadband Networks," Technical Report TR-321, Issue 1, pp. 1-44, The Broadband Forum (Nov. 2015).

* cited by examiner

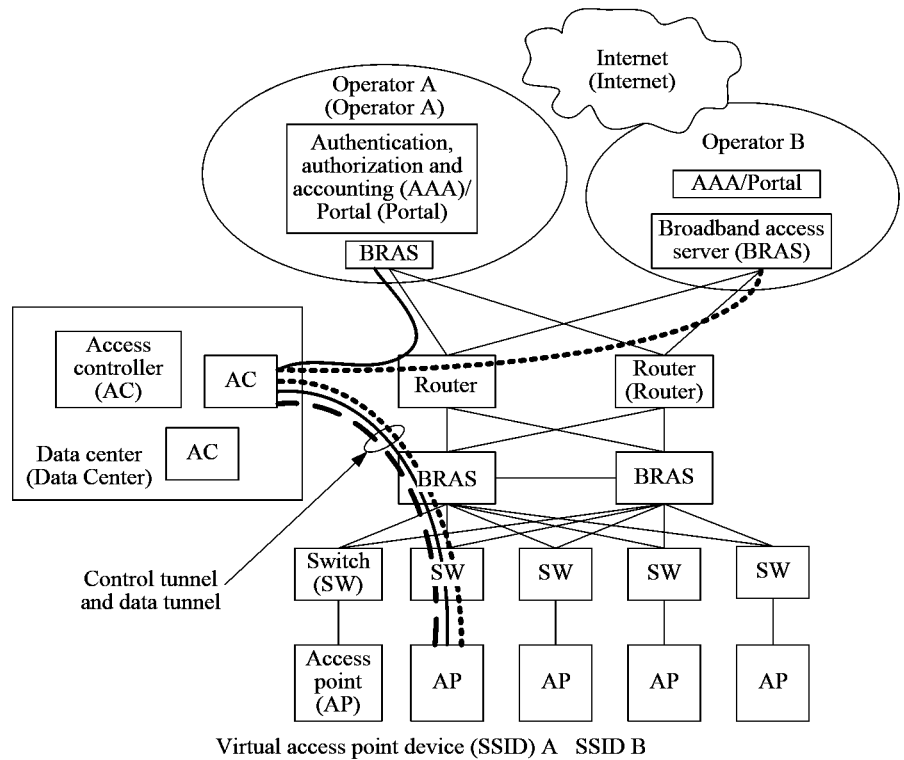

FIG. 1

An AC sends a first configuration message to an AP, where the first configuration message includes a first tunnel establishment configuration parameter, and the first tunnel establishment configuration parameter includes information about binding between an IP address of at least one broadband access server and at least one service set identifier, so that the AP establishes a data tunnel with the at least one BRAS according to the first tunnel establishment configuration parameter  ⟋ 100

The AC establishes a control tunnel with at least one AP  ⟋ 101

METHOD FOR ESTABLISHING WIRELESS LOCAL AREA NETWORK TUNNEL, APPARATUS, AND ACCESS NETWORK SYSTEM

CROSS-REFERENCE TO RELATED APPLICATIONS

This application is a continuation of International Application No. PCT/CN2015/072497, filed on Feb. 9, 2015, which claims priority to Chinese Patent Application No. 201410073210.3, filed on Feb. 28, 2014, both of which are hereby incorporated by reference in their entireties.

TECHNICAL FIELD

The embodiments of the invention relate to communications technologies, and in particular, to a method for establishing a wireless local area network tunnel, an apparatus, and an access network system.

BACKGROUND

As data service requirements rapidly grow, and a data carrying capability of a 2G/3G (second-generation/third-generation) wireless network is limited, offloading a data service by using a Wireless Local Area Network (WLAN) has become a preferred solution of an operator.

A WLAN technology-based network structure generally includes devices such as a station (STAtion, STA for short), an Access Point (AP), and an Access Controller (AC). A function of the AP is to connect the STA to a wired network, and the AC manages the AP by using the Control and Provisioning of Wireless Access Points (CAPWAP) protocol. Generally, a CAPWAP tunnel is established between the AP and the AC as a forwarding channel of control and data packets between the AP and the AC.

However, by means of the prior art, when an AC and a Broadband Remote Access Server (BRAS) are disposed separately, because all user data needs to be forwarded by the AC, overheads of the AC are increased, and in an existing AC networking manner, a large quantity of site Virtual Local Area Networks (VLANs) need to be configured between the AC and the BRAS to acquire binding relationships between different APs and different BRASs. Therefore, by means of the prior art, workload and costs of configuration, management, and maintenance of the AC are greatly increased.

SUMMARY

The embodiments of the invention provides a method for establishing a wireless local area network tunnel, an apparatus, and an access network system, so as to reduce additional overheads of a controller.

A first aspect of the embodiments of the invention provides a method for establishing a wireless local area network tunnel, including:

sending, by an access controller, a first configuration message to an access point device, where the first configuration message includes a first tunnel establishment configuration parameter, and the first tunnel establishment configuration parameter includes information about binding between an IP address of at least one broadband access server and at least one service set identifier, so that the access point device establishes a data tunnel with the at least one broadband access server according to the first tunnel establishment configuration parameter; and establishing, by the access controller, a control tunnel with at least one access point device.

With reference to the first aspect, in a first possible implementation manner, the method further includes:

sending, by the access controller, a second configuration message to the broadband access server or an authentication, authorization and accounting device, where the second configuration message includes a second tunnel establishment configuration parameter, and the second tunnel establishment configuration parameter includes information about binding between an IP address of the at least one access point device and the at least one service set identifier.

A second aspect of the embodiments of the invention provides an access controller, including:

a sending module, configured to send a first configuration message to an access point device, where the first configuration message includes a first tunnel establishment configuration parameter, and the first tunnel establishment configuration parameter includes information about binding between an IP address of at least one broadband access server and at least one service set identifier, so that the access point device establishes a data tunnel with the at least one broadband access server according to the first tunnel establishment configuration parameter; and a control tunnel establishment module, configured to establish a control tunnel with at least one access point device.

With reference to the second aspect, in a first possible implementation manner, the sending module is further configured to send a second configuration message to the broadband access server or an authentication, authorization and accounting device, where the second configuration message includes a second tunnel establishment configuration parameter, and the second tunnel establishment configuration parameter includes information about binding between an IP address of the at least one access point device and the at least one service set identifier.

A third aspect of the embodiments of the invention provides an access point device, including:

a receiving module, configured to receive a first configuration message sent by an access controller, where the first configuration message includes a first tunnel establishment configuration parameter, and the first tunnel establishment configuration parameter includes information about binding between an IP address of at least one broadband access server and at least one service set identifier;

a control tunnel establishment module, configured to establish a control tunnel with the access controller; and a data tunnel establishment module, configured to establish a data tunnel with the at least one broadband access server according to the first tunnel establishment configuration parameter.

With reference to the third aspect, in a first possible implementation manner, the access point device further includes:

a sending module, configured to send a data tunnel establishment request to the at least one broadband access server according to the first tunnel establishment configuration parameter.

With reference to the first possible implementation manner of the third aspect, in a second possible implementation manner, the receiving module is further configured to receive a data tunnel establishment response message sent by the at least one broadband access server, where when security of the access point device is successfully verified by the at least one broadband access server, the data tunnel establishment response message includes verification success indication information.

With reference to the third aspect or any possible implementation manner of the third aspect, in a third possible implementation manner, the first tunnel establishment configuration parameter further includes information about binding between the at least one service set identifier and at least one virtual local area network identifier.

With reference to the third possible implementation manner of the third aspect, in a fourth possible implementation manner, the access point device further includes:

an identifier adding module, configured to: when the access point device has the information about binding between the at least one service set identifier and the at least one virtual local area network identifier, add a corresponding virtual local area network identifier for user data according to a service set identifier selected by a user and the information about binding between the at least one service set identifier and the at least one virtual local area network identifier, where the sending module is further configured to send the user data to a corresponding broadband access server by using the data tunnel between the access point device and the broadband access server according to the information about binding between the IP address of the at least one broadband access server and the at least one service set identifier.

A fourth aspect of the embodiments of the invention provides a broadband access server, including:

an acquiring module, configured to acquire a second tunnel establishment configuration parameter, where the second tunnel establishment configuration parameter includes information about binding between an IP address of at least one access point device and at least one service set identifier; and a data tunnel establishment module, configured to establish a data tunnel with the at least one access point device according to the second tunnel establishment configuration parameter.

With reference to the fourth aspect, in a first possible implementation manner, the acquiring module is specifically configured to receive a second configuration message sent by an access controller, where the second configuration message includes the second tunnel establishment configuration parameter; or the acquiring module is specifically configured to acquire the second tunnel establishment configuration parameter from an authentication, authorization and accounting device.

With reference to the fourth aspect or the first possible implementation manner of the fourth aspect, in a second possible implementation manner, the broadband access server further includes: a receiving module, configured to receive a data tunnel establishment request sent by the at least one access point device.

With reference to the second possible implementation manner of the fourth aspect, in a third possible implementation manner, the broadband access server further includes: a verification module, configured to verify legality of the at least one access point device according to the second tunnel establishment configuration parameter; and a sending module, configured to send a data tunnel establishment response message to the at least one access point device, where when the at least one access point device succeeds in the legality verification, the data tunnel establishment response message includes verification success indication information, where the data tunnel establishment module is specifically configured to establish a data tunnel with the at least one access point device succeeding in the legality verification.

A fifth aspect of the embodiments of the invention provides an access network system, including at least one of the access controllers according to the second aspect or any feasible implementation of the second aspect, at least one of the access point devices according to the third aspect or any feasible implementation of the third aspect, and at least one of the broadband access servers according to the fourth aspect or any feasible implementation of the fourth aspect.

According to the method for establishing a wireless local area network tunnel, the apparatus, and the access network system provided by embodiments of the invention, an AC sends a first configuration message to an AP, where the first configuration message includes a first tunnel establishment configuration parameter, and the first tunnel establishment configuration parameter includes information about binding between an IP address of at least one BRAS and at least one SSID, so that the BRAS establishes a data tunnel with the AP, and the AC establishes a control tunnel with the AP, thereby separating the data tunnel from the control tunnel, and reducing unnecessary overheads of the AC.

BRIEF DESCRIPTION OF DRAWINGS

To describe the technical solutions in the embodiments of the invention or in the prior art more clearly, the following briefly describes the accompanying drawings required for describing the embodiments or the prior art. Apparently, the accompanying drawings in the following description show some embodiments of the invention, and persons of ordinary skill in the art may still derive other drawings from these accompanying drawings without creative efforts.

FIG. 1 is a schematic diagram of an access network deployment scenario in the prior art;

FIG. 2 is a schematic flowchart of a method for establishing a wireless local area network tunnel according to an embodiment of the invention;

DESCRIPTION OF EMBODIMENTS

Figure 3:
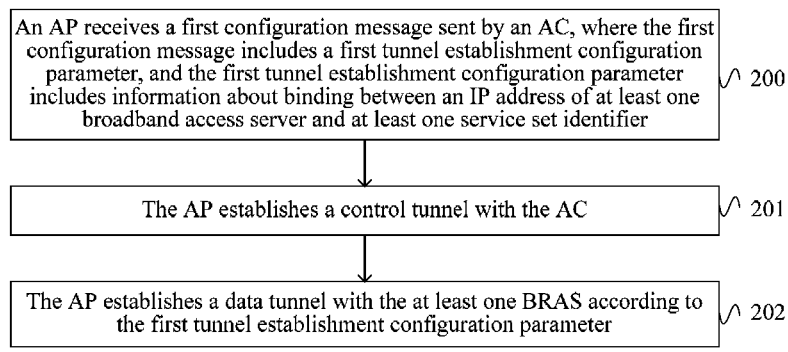
FIG. 3 is a schematic flowchart of another method for establishing a wireless local area network tunnel according to an embodiment of the invention.

To make the objectives, technical solutions, and advantages of the embodiments of the invention clearer, the following clearly and completely describes the technical solutions in the embodiments of the invention with reference to the accompanying drawings in the embodiments of the invention. Apparently, the described embodiments are some but not all of the embodiments of the invention. All other embodiments obtained by persons of ordinary skill in the art based on the embodiments of the invention without creative efforts shall fall within the protection scope of the invention.

FIG. 1 is a schematic diagram of an access network deployment scenario in the prior art. As shown in FIG. 1, in FIG. 1, one access point device (Access Point, AP for short) provides multiple service set identifiers (SSID for short), and each SSID corresponds to one virtual access point device (Virtual Access Point, VAP for short) and belongs to a different operator. The VAP is mapped to a different virtual local area network (VLAN for short), that is, user data of each operator may be distinguished based on the VLAN. Data of different SSIDs is mapped to different VLANs and is connected to different operators by using a common access controller (AC for short). Each operator deploys an Authentication Authorization and Accounting (AAA) device and a portal device, and the AC forwards the user data to a corresponding operator network according to the VLAN. It may be known according to FIG. 1 that in the prior art, an AP manages a VLAN, and an AC manages a VLAN and a service site VLAN. Complexity of large-scale AP deployments (such as VLAN configuration) is high. In addition, because a control tunnel is not separated from a data tunnel, all user data must be forwarded by the AC, in the deployment scenario in FIG. 1, user traffic is rerouted. Because in this operating mode, each operator performs authentication and accounting respectively, the AC does not need to sense traffic, and the rerouting of the user traffic greatly increases overheads of the AC.

To resolve the foregoing problem generated in the prior art, the following embodiments of the invention provide a method for establishing a wireless local area network tunnel, an apparatus, and an access network system, so as to separate a data tunnel from a control tunnel, reduce unnecessary overheads of an AC, and simplify complexity of AP deployment.

FIG. 2 is a schematic flowchart of a method for establishing a wireless local area network tunnel according to an embodiment of the invention, where the method is performed by an Access Controller (AC). Referring to FIG. 2, the method includes the following steps:

Step 100: The AC sends a first configuration message to an Access Point (AP).

To separate a data tunnel from a control tunnel, the data tunnel needs to be established between the AP and a broadband access server (BRAS for short). Therefore, the AP needs to be notified of a binding relationship between the BRAS and an SSID, so that the AP selects, according to the binding relationship, the corresponding BRAS to establish the data tunnel. Specifically, the first configuration message includes a first tunnel establishment configuration parameter, and the first tunnel establishment configuration parameter includes information about binding between an IP address of at least one BRAS and at least one SSID. The binding information represents the binding relationship between the BRAS and the SSID. It should be noted that, by means of the first tunnel establishment configuration parameter, when the AP discovers a BRAS that corresponds to an SSID provided by the AP, the AP establishes a data tunnel with the at least one BRAS according to the first tunnel establishment configuration parameter. It should be noted that the AP establishes the data tunnel according to an IP address of the BRAS in the first tunnel establishment configuration parameter, and then for an SSID selected by a user, the AP determines a corresponding data tunnel by performing matching between the SSID and the information about binding between the BRAS and the SSID, and sends data of the SSID to the corresponding BRAS by using the data tunnel.

Step 101: The AC establishes a control tunnel with at least one AP.

It should be noted that the control tunnel established by the AC with the at least one AP is separated from the data tunnel. A CAPWAP tunnel is established between the AP and the AC as a forwarding channel of a control packet between the AP and the AC.

According to the AC provided by this embodiment, the AC sends a first configuration message to the AP, where the first configuration message includes a first tunnel establishment configuration parameter, and the first tunnel establishment configuration parameter includes information about binding between an IP address of at least one broadband access server and at least one SSID, so that a BRAS establishes a data tunnel with the AP, and the AC establishes a control tunnel with the AP, thereby separating the data tunnel from the control tunnel, and reducing unnecessary overheads of the AC.

Preferably, based on the steps shown in FIG. 1, the method further includes:

Step 102: The AP sends a second configuration message to a BRAS or an authentication, authorization and accounting device.

The second configuration message includes a second tunnel establishment configuration parameter, and the second tunnel establishment configuration parameter includes information about binding between an IP address of the at least one AP and the at least one SSID. It should be noted that step 102 and the steps in FIG. 1 has no direct precedence relationship, and it only needs to ensure that step 102 is performed before the BRAS establishes the data tunnel with the AP.

It should be noted that the AP and the authentication, authorization and accounting device, and the AP and the BRAS may interact by using, but not limited to, a RADIUS message, that is, the second configuration message may be specifically the RADIUS message.

Based on a reason the same as that of step 100, another feasible manner to enable the AP to establish the data tunnel with the BRAS is that: based on the fact that the first tunnel establishment configuration parameter is sent to the AP, the BRAS is notified of a binding relationship between the AP and the SSID, so that the BRAS selects, according to the binding relationship, the corresponding AP to establish the data tunnel. However, there are multiple manners in which the BRAS is notified of the binding relationship between the AP and the SSID, examples in which the BRAS is directly notified, and notified by using the authentication, authorization and accounting device, of the binding relationship between the AP and the SSID are only used for description herein, and this embodiment of the invention does not limit other feasible implementation manners. Specifically, the second configuration message includes the second tunnel establishment configuration parameter, and the second tunnel establishment configuration parameter includes the information about binding between the IP address of the at least one AP and the at least one SSID, and the binding information represents the binding relationship between the AP and the SSID.

It should be noted that for an implementation manner in which the AC directly sends the second configuration message to the BRAS, a large quantity of existing protocols need to be modified in this manner. To make the best use of a protocol architecture in the prior art, avoid unnecessary protocol modifications, and reduce costs, in an existing protocol, the AC interacts with the authentication, authorization and accounting device, and the authentication, authorization and accounting device interacts with the BRAS, so that additional costs caused by the protocol modifications can be avoided. That is, the AC sends the second configuration message including the second tunnel establishment configuration parameter to the authentication, authorization and accounting device, and when the BRAS needs to establish the data tunnel with the AP, the BRAS acquires the corresponding second tunnel establishment configuration parameter from the authentication, authorization and accounting device.

Preferably, the first tunnel establishment configuration parameter further includes information about binding between the at least one SSID and at least one Virtual Local Area Network Identifier (VLAN ID).

Preferably, when the first tunnel establishment configuration parameter further includes the information about binding between the at least one SSID and the at least one VLAN ID, the second tunnel establishment configuration parameter further includes the information about binding between the at least one SSID and the at least one VLAN ID.

Because in the prior art, the data tunnel is not separated from the control tunnel, a site VLAN needs to be specially established to describe correspondences between different APs and different BRASs. Otherwise, the BRAS cannot learn from the AC that data is specifically sent from which AP. However, in this embodiment, because the AC separately notifies the AP and the BRAS of the information about binding between the at least one SSID and the at least one VLAN ID, no site VLAN needs to be added to distinguish the different APs, thereby simplifying complexity of AP deployment.

It should be noted that when the AP provides multiple SSIDs, in this case, different SSIDs correspond to different VLAN IDs, and according to only the information about binding between the IP address of the at least one AP and the at least one SSID, an operator cannot further process, a specific corresponding service set belonging to the operator on the BRAS. To enable subsequent refinement control (such as flow measurement control and accounting) of the operator, the first tunnel establishment configuration parameter further includes the information about binding between the at least one SSID and the at least one VLAN ID, and the second tunnel establishment configuration parameter further includes the information about binding between the at least one SSID and the at least one VLAN ID, so that the operator subsequently performs, according to the information about binding between the at least one SSID and the at least one VLAN ID, refinement control on service sets that correspond to the different SSIDs, and a specific implementation solution of the refinement control is not limited herein. Further, a feasible implementation manner related to verifying, by the BRAS, legality of the at least one AP according to the second tunnel establishment configuration parameter is that: the BRAS verifies the legality of the at least one AP according to the information about binding between the IP address of the at least one AP and the at least one SSID, and the information about binding between the at least one SSID and the at least one VLAN ID.

Preferably, when the BRAS supports multiple tunnel types (such as the L2TP, the CAPWAP, the GRE, and the IPSec), the AP may select a tunnel type that can be supported by the AP, and notify a corresponding BRAS of the tunnel type, which may be specifically implemented by further adding at least one tunnel type corresponding to an IP address of each BRAS to the first tunnel establishment configuration parameter.

Similarity, when the AP supports multiple tunnel types (such as the L2TP, the CAPWAP, the GRE, and the IPSEC), the BRAS may select a tunnel type that can be supported by the BRAS, and notify a corresponding AP of the tunnel type. Specifically, at least one tunnel type corresponding to an IP address of each AP may be further added to the second tunnel establishment configuration parameter.

FIG. 3 is a schematic flowchart of another method for establishing a wireless local area network tunnel according to an embodiment of the invention, where the method for establishing a wireless local area network tunnel in FIG. 3 is performed by an AP. Referring to FIG. 3, the method includes the following steps:

Step 200: The AP receives a first configuration message sent by an AC.

Specifically, the first configuration message includes a first tunnel establishment configuration parameter, and the first tunnel establishment configuration parameter includes information about binding between an IP address of at least one BRAS and at least one SSID.

Step 201: The AP establishes a control tunnel with the AC.

It should be noted that the control tunnel established by the AP with the AC is separated from the following data tunnel. A CAPWAP tunnel is established between the AP and the AC as a forwarding channel of a control packet between the AP and the AC.

Step 202: The AP establishes a data tunnel with the at least one BRAS according to a first tunnel establishment configuration parameter.

Specifically, based on the information about binding between the IP address of the at least one BRAS and the at least one SSID provided in the first tunnel establishment configuration parameter, the AP may establish the data tunnel with the BRAS. When multiple BRASs allow the AP to establish data tunnels with the multiple BRASs, the AP establishes the data tunnels with the multiple BRASs. It should be noted that the AP establishes the data tunnel according to the IP address of the BRAS in the first tunnel establishment configuration parameter, and then for an SSID selected by a user, the AP determines a corresponding data tunnel by performing matching between the SSID and the information about binding between the BRAS and the SSID, and sends data of the SSID to the corresponding BRAS by using the data tunnel.

According to the AP provided by this embodiment, the AP receives a first configuration message sent by an AC, where the first configuration message includes a first tunnel establishment configuration parameter, and the first tunnel establishment configuration parameter includes information about binding between an IP address of at least one broadband access server and at least one SSID, the AP establishes a control tunnel with the AC, and the AP establishes a data tunnel with the at least one BRAS according to the first tunnel establishment configuration parameter, thereby separating the data tunnel from the control tunnel, and reducing unnecessary overheads of the AC.

Further, after step 200 in FIG. 3, the method may further include the following steps:

Step 203: The AP sends a data tunnel establishment request to the at least one BRAS according to the first tunnel establishment configuration parameter.

Specifically, when the AP learns that an SSID corresponding to a service set provided by the AP satisfies the information about binding between the IP address of the at least one BRAS and the at least one SSID in the first tunnel establishment configuration parameter, the AP sends the data tunnel establishment request to a BRAS that has a binding relationship with the SSID provided by the AP. It should be noted that when multiple service sets provided by the AP correspond to different BRASs, and the first tunnel establishment configuration parameter has binding relationships between the multiple service sets and the different BRASs, the AP may separately send data tunnel establishment requests to the multiple BRAS.

Further, after step 203, the method may further include: receiving, by the AP, a data tunnel establishment response message sent by the at least one BRAS.

Specifically, when security of the AP is successfully verified by the at least one BRAS, the data tunnel establishment response message includes verification success indication information. It should be noted that when the AP sends the data tunnel establishment request to the at least one BRAS, the BRAS that receives the request verifies, according to the second tunnel establishment configuration parameter acquired by the BRAS, the security of the AP that sends the data tunnel establishment request, and when the security of the AP is successfully verified by the at least one BRAS, the data tunnel establishment response message sent by the BRAS includes the verification success indication information, used to indicate that the AP can establish the data tunnel with the BRAS.

Further, a feasible implementation manner of step 202 in FIG. 3 is:

establishing, by the AP, the data tunnel with the at least one BRAS according to the verification success indication information and the first tunnel establishment configuration parameter.

Specifically, when the data tunnel establishment response message includes the verification success indication information, it indicates that the BRAS allows the AP to establish the data tunnel with the BRAS, and in this case, based on the information about binding between the IP address of the at least one BRAS and the at least one SSID provided in the first tunnel establishment configuration parameter, the AP may establish the data tunnel with the BRAS. When multiple BRASs allow the AP to establish data tunnels with the multiple BRASs, the AP establishes the data tunnels with the multiple BRASs.

Preferably, the first tunnel establishment configuration parameter further includes information about binding between the at least one SSID and at least one VLAN ID.

Because in the prior art, the data tunnel is not separated from the control tunnel, a site VLAN needs to be specially established to describe correspondences between different APs and different BRASs. Otherwise, the BRAS cannot learn from the AC that data is specifically sent from which AP. However, in this embodiment, because the AC notifies the AP of related binding information, no site VLAN needs to be added to distinguish the different APs, thereby simplifying complexity of AP deployment.

Preferably, after step 202 in FIG. 3, the method further includes:

when the AP has the information about binding between the at least one SSID and the at least one VLAN ID, adding, by the AP, a corresponding VLAN ID for user data according to an SSID selected by a user and the information about binding between the at least one SSID and the at least one VLAN ID; and sending, according to the information about binding between the IP address of the at least one BRAS and the at least one SSID, the user data to a corresponding BRAS by using the data tunnel between the AP and the BRAS.

Preferably, the first tunnel establishment configuration parameter further includes at least one tunnel type corresponding to an IP address of each BRAS.

Figure 4:
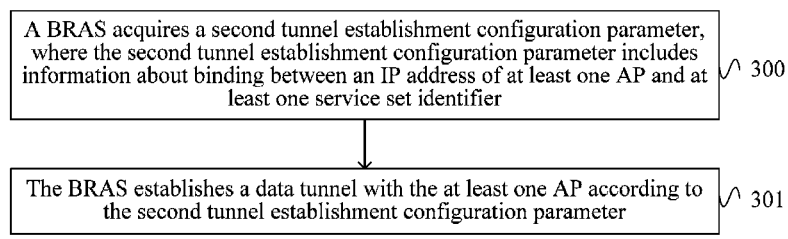
FIG. 4 is a schematic flowchart of another method for establishing a wireless local area network tunnel according to an embodiment of the invention.

FIG. 4 is a schematic flowchart of another method for establishing a wireless local area network tunnel according to an embodiment of the invention, where the method is performed by a broadband access server (BRAS for short). Referring to FIG. 4, the method includes the following steps:

Step 300: The BRAS acquires a second tunnel establishment configuration parameter.

Specifically, the second tunnel establishment configuration parameter includes information about binding between an IP address of at least one AP and at least one SSID.

Step 301: The BRAS establishes a data tunnel with at least one AP according to the second tunnel establishment configuration parameter.

According to the BRAS provided by this embodiment, the BRAS acquires a second tunnel establishment configuration parameter, where the second tunnel establishment configuration parameter includes information about binding between an IP address of at least one AP and at least one SSID; and the BRAS establishes a data tunnel with the at least one AP according to the second tunnel establishment configuration parameter, thereby separating the data tunnel from a control tunnel, and reducing unnecessary overheads of an AC.

Further, step 300 in FIG. 4 may be implemented by either one of the following feasible implementation manners:

manner 1: the broadband access server receives a second configuration message sent by the AC, where the second configuration message includes the second tunnel establishment configuration parameter; and manner 2: the broadband access server acquires the second tunnel establishment configuration parameter from an authentication, authorization and accounting device.

It should be noted that for the manner 2, the AC sends the second tunnel establishment configuration parameter to the authentication, authorization and accounting device in advance. In addition, by means of interaction processes between the AC and the authentication, authorization and accounting device, and between the authentication, authorization and accounting device and the broadband access server in the prior art, a large quantity of protocol modifications caused when the AC directly sends the second configuration message to the broadband access server in the manner 1 are avoided, thereby reducing application costs of the method for establishing a wireless local area network tunnel according to this embodiment of the invention.

Further, after step 300 in FIG. 4, the method further includes:

Step 302: The BRAS receives a data tunnel establishment request sent by the at least one AP.

After receiving the data tunnel establishment request sent by the at least one AP, the BRAS may directly establish the data tunnel with the at least one AP according to the second tunnel establishment configuration parameter, or may perform legality verification on the AP based on the data tunnel establishment request.

For a scenario in which the legality verification needs to be performed on the AP, after step 302, the method further includes:

verifying, by the BRAS, legality of the at least one AP according to the second tunnel establishment configuration parameter.

Specifically, when the at least one AP succeeds in the legality verification, a data tunnel establishment response message includes verification success indication information, or when the AP fails the legality verification, the data tunnel establishment response message may further include verification failure indication information, to indicate that the AP cannot establish the data tunnel.

The BRAS sends a data tunnel establishment response message to the at least one AP, where when the at least one AP succeeds in the legality verification, the data tunnel establishment response message includes the verification success indication information.

Therefore, based on step 302, a feasible implementation manner of step 301 in FIG. 4 is:

establishing, by the BRAS, the data tunnel with the at least one AP succeeding in the legality verification.

Further, a feasible implementation manner related to verifying, by the BRAS, the legality of the at least one AP according to the second tunnel establishment configuration parameter is that: the BRAS verifies the legality of the at least one AP according to the information about binding between the IP address of the at least one AP and the at least one SSID, and information about binding between the at least one SSID and at least one VLAN ID.

Preferably, the second tunnel establishment configuration parameter further includes the information about binding between the at least one SSID and the at least one VLAN ID.

Because in the prior art, the data tunnel is not separated from the control tunnel, a site VLAN needs to be specially established to describe correspondences between different APs and different BRASs. Otherwise, the BRAS cannot learn from the AC that data is specifically sent from which AP. However, in this embodiment, because the AC notifies the BRAS of the information about binding between the at least one SSID and the at least one VLAN ID, no site VLAN needs to be added to distinguish the different APs, thereby simplifying complexity of AP deployment.

It should be noted that when the AP provides multiple SSIDs, in this case, different SSIDs correspond to different VLAN IDs, and according to only the information about binding between the IP address of the at least one AP and the at least one SSID, an operator cannot further process, according to the binding information, a specific corresponding service set belonging to the operator on the BRAS. To enable subsequent refinement control (such as flow measurement control and accounting) of the BRAS, the second tunnel establishment configuration parameter further includes the information about binding between the at least one SSID and the at least one VLAN ID, so that the operator subsequently performs, according to the information about binding between the at least one SSID and the at least one VLAN ID, refinement control on service sets that correspond to the different SSIDs, and a specific implementation solution of the refinement control is not limited herein.

It should be noted that a feasible implementation manner of the verifying, by the BRAS, the legality of the at least one AP according to the second tunnel establishment configuration parameter is that:

the broadband access server verifies the legality of the at least one AP according to the information about binding between the IP address of the at least one AP and the at least one SSID, and the information about binding between the at least one SSID and the at least one VLAN ID.

Further, the second tunnel establishment configuration parameter further includes at least one tunnel type corresponding to an IP address of each AP.

Figure 5:
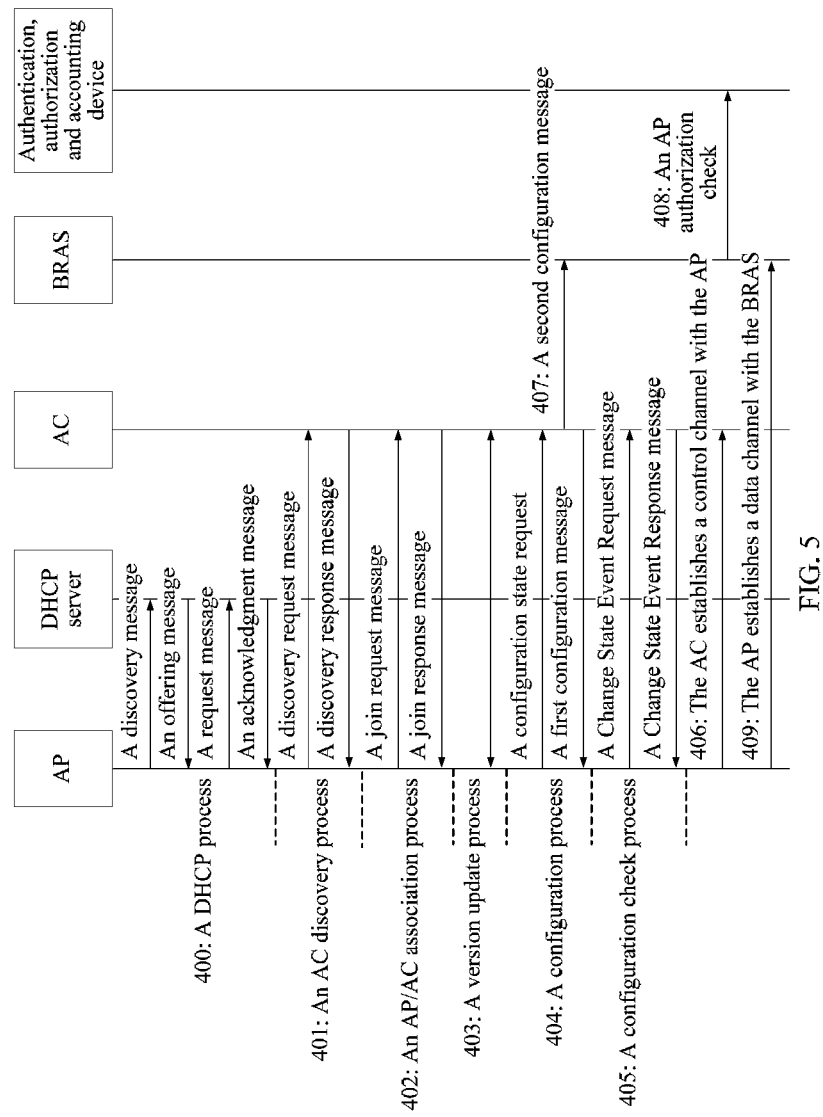
FIG. 5 is a schematic flowchart of another method for establishing a wireless local area network tunnel according to an embodiment of the invention.

FIG. 5 is a schematic flowchart of another method for establishing a wireless local area network tunnel according to an embodiment of the invention. Referring to FIG. 5, it may be known that this embodiment further describes the foregoing embodiments and preferred feasible implementation manners from an overall perspective by combining an AC, an AP, a broadband access server, and an authentication, authorization and accounting device. Referring to FIG. 5, the method includes the following steps:

Step 400: A Dynamic Host Configuration Protocol (Dynamic host configuration protocol, DHCP for short) process: The AP acquires an IP address of the AP from a DHCP server.

Specifically, the DHCP process includes a discovery message (discovery), an offering message (offer), a request message (request), and an acknowledgment message (ack).

Step 401: An AC discovery process.

Specifically, the AC discovery process is used for the AP to discover an AC, and the AC discovery process includes a discovery request message (Discover request) and a discovery response message (Discover response).

Step 402: An AP/AC association process.

Specifically, when the AP determines to select the AC, a join phase is started. The join phase includes a join request message (Join request) and a join response message (Join Response).

Step 403: A version update process.

It should be noted that step 403 is optional and is used to load an AP version.

Step 404: A configuration process.

The configuration process includes a configuration state request and a first configuration message. The AC sends the first configuration message to the AP.

Specifically, the first configuration message includes a first tunnel establishment configuration parameter, and the first tunnel establishment configuration parameter includes information about binding between an IP address of a BRAS at another side and an SSID. Optionally, the first configuration message may further carry information about binding between the SSID and a VLAN ID, and the AP establishes a data tunnel with a corresponding BRAS according to the information. Using Table 1 as an example, the AP provides an SSID A1, an SSID A2, an SSID B1, an SSID B2, and an SSID C, where the SSID A1 and the SSID A2 belong to an operator A, the SSID B1 and the SSID B2 belong to an operator B, and the SSID C belongs to an operator C. An IP address of a BRAS (an access gateway of an operator network) of the operator A is an IP ADDRESS 1, an IP address of a BRAS of the operator B is an IP ADDRESS 2, and an IP address of a BRAS of the operator C is an IP ADDRESS 3. Optionally, the BRAS of the operator must provide the IP address, and may further carry a tunnel type (such as the L2TP, the CAPWAP, the GRE, and the IPSEC) supported by the BARS. Optionally, the AC may further deliver VLAN IDs corresponding to different SSIDs, for example, data of the SSID A1 is mapped to a VLAN ID 1, and data of the SSID A2 is mapped to a VLAN ID 2, so that after receiving a packet, the BRAS of the operator A may perform refinement control again according to the VLAN ID.

TABLE 1

Binding relationship between a BRAS, an SSID, and a VLAN ID

| SSID | BRAS INFORMATION | VLAN ID (OPTIONAL) |
|---|---|---|
| SSID A1 | IP ADDRESS 1 | VLAN ID 1 |
| SSID A2 | TUNNEL TYPES | VLAN ID 2 |
| SSID B1 | IP ADDRESS 2 | VLAN ID 1 |
| SSID B2 | TUNNEL TYPES | VLAN ID 2 |
| SSID C | IP ADDRESS 3 TUNNEL TYPES | VLAN ID 3 |

It may be known from Table 1 that a relationship between an SSID and a VLAN ID may be 1:1 or may be n:1, but cannot be 1:n.

Step 405: A configuration check process.

Specifically, after the configuration phase is completed, the configuration check process is started. The configuration check includes a change state event request (Change State Event Request) message and a change state event response (Change State Event Response) message.

Step 406: The AC establishes a control tunnel with the AP.

Specifically, control packets are exchanged between the AP and the AC by using a control tunnel of a CAPWAP tunnel.

It should be noted that the following step 407 and step 408 are two feasible implementation manners, and an access network system in this embodiment of the invention may select and run one of the steps.

Step 407: The AC sends a second configuration message to a BRAS.

Specifically, the second configuration message includes a second tunnel establishment configuration parameter, and further, the second tunnel establishment configuration parameter includes information about binding between an IP address of an AP and the SSID. Optionally, the second configuration message may further carry the information about binding between the SSID and the VLAN ID, and the BRAS verifies, according to the information, legality of an AP that sends a tunnel establishment request to the BRAS. Using Table 2 as an example, an IP address of an AP 1 is an IP ADDRESS 1, and an SSID A1 and an SSID A2 are provided, where the SSID A1 and the SSID A2 belong to an operator A. Optionally, the AP must provide the IP address, and may further carry a tunnel type (such as the L2TP, the CAPWAP, the GRE, and the IPSec) supported by the AP. Optionally, the AC may further deliver VLAN IDs corresponding to different SSIDs, for example, for the AP 1, data of the SSID A1 is mapped to a VLAN ID 1, and data of the SSID A2 is mapped to a VLAN ID 2, so that after receiving a packet, a BRAS of the operator A may perform refinement control again according to the VLAN ID.

TABLE 2

Binding relationship between an AP, an SSID, and a VLAN ID

| AP INFORMATION | SSID (OPTIONAL) | VLAN ID (OPTIONAL) |
|---|---|---|
| IP ADDRESS 1 TUNNEL TYPES | SSID A1 | VLAN ID 1 |
|  | SSID A2 | VLAN ID 2 |
| IP ADDRESS 2 TUNNEL TYPES | SSID A1 | N/A |

It should be noted that in step 407, the AC sends the second configuration message to the BRAS, and obviously, when a solution in which the BRAS acquires the second tunnel establishment configuration parameter from an authentication, authorization and accounting device is used, the AC sends the second configuration message to the authentication, authorization and accounting device.

Step 408: The BRAS initiates an AP authorization check to the authentication, authorization and accounting device.

Specifically, the objective of the authorization check is that: after receiving the tunnel establishment request, the BRAS acquires the second tunnel establishment configuration parameter from the authentication, authorization and accounting device. It should be noted that the BRAS may not use receiving the tunnel establishment request sent by the AP as a trigger condition of initiating the authorization check, that is, the BRAS proactively acquires the second tunnel establishment configuration parameter from the authentication, authorization and accounting device.

Step 409: Establish a data tunnel.

Specifically, the data tunnel is established between the AP and the BARS to forward a user data packet.

Figure 6:
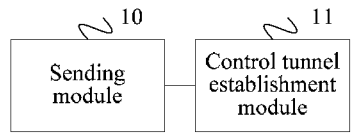
FIG. 6 is a schematic structural diagram of an AC according to an embodiment of the invention.

FIG. 6 is a schematic structural diagram of an AC according to an embodiment of the invention, where the AC may perform the steps of the method shown in FIG. 2, and functions of parameters in this embodiment are the same as functions of parameters in the corresponding embodiment in FIG. 2, and details are not described herein again. Referring to FIG. 6, the AC includes: a sending module 10 and a control tunnel establishment module 11.

The sending module 10 is configured to send a first configuration message to an AP.

Specifically, the first configuration message includes a first tunnel establishment configuration parameter, and the first tunnel establishment configuration parameter includes information about binding between an IP address of at least one BARS and at least one SSID, so that the AP establishes a data tunnel with the at least one BARS according to the first tunnel establishment configuration parameter. It should be noted that the AP establishes the data tunnel according to the IP address of the BRAS in the first tunnel establishment configuration parameter, and then for an SSID selected by a user, the AP determines a corresponding data tunnel by performing matching between the SSID and the information about binding between the BRAS and the SSID, and sends data of the SSID to the corresponding BRAS by using the data tunnel.

The control tunnel establishment module 11 is configured to establish a control tunnel with at least one AP.

It should be noted that the control tunnel established by the AC with the at least one AP is separated from the data tunnel. A CAPWAP tunnel is established between the AP and the AC as a forwarding channel of a control packet between the AP and the AC.

According to the AC provided by this embodiment, the sending module sends a first configuration message to an AP, where the first configuration message includes a first tunnel establishment configuration parameter, and the first tunnel establishment configuration parameter includes information about binding between an IP address of at least one BARS and at least one SSID, so that the AP establishes a data tunnel with the at least one BARS according to the first tunnel establishment configuration parameter; and the control tunnel establishment module establishes a control tunnel with the AP, thereby separating the data tunnel from the control tunnel, and reducing unnecessary overheads of the AC.

Further, the sending module 10 is further configured to send a second configuration message to the BRAS or an authentication, authorization and accounting device.

Specifically, the second configuration message includes a second tunnel establishment configuration parameter, and the second tunnel establishment configuration parameter includes information about binding between an IP address of the at least one AP and the at least one SSID. It should be noted that the AP and the authentication, authorization and accounting device, and the AP and the BRAS may interact by using, but not limited to, a RADIUS message, that is, the second configuration message may be specifically the RADIUS message.

Another feasible manner to enable the AP to establish the data tunnel with the BRAS is that: based on the fact that the sending module 10 sends the first tunnel establishment configuration parameter to the AP, the sending module 10 notifies the BRAS of a binding relationship between the AP and the SSID, so that the BRAS selects, according to the binding relationship, the corresponding AP to establish the data tunnel. However, there are multiple manners in which the sending module 10 notifies the BRAS of the binding relationship between the AP and the SSID, examples in which the sending module 10 directly notifies the BRAS of the binding relationship between the AP and the SSID, and notifies the BRAS of the binding relationship between the AP and the SSID by using the authentication, authorization and accounting device are only used for description herein, and this embodiment of the invention does not limit other feasible implementation manners. Specifically, the second configuration message includes the second tunnel establishment configuration parameter, and the second tunnel establishment configuration parameter includes the information about binding between the IP address of the at least one AP and the at least one SSID, and the binding information represents the binding relationship between the AP and the SSID.

It should be noted that for an implementation manner in which the sending module 10 directly sends the second configuration message to the BRAS, a large quantity of existing protocols need to be modified in this manner. To make the best use of a protocol architecture in the prior art, avoid unnecessary protocol modifications, and reduce costs, in an existing protocol, the AC interacts with the authentication, authorization and accounting device, and the authentication, authorization and accounting device interacts with the BRAS, so that additional costs caused by the protocol modifications can be avoided. That is, the sending module 10 sends the second configuration message including the second tunnel establishment configuration parameter to the authentication, authorization and accounting device, and when the BRAS needs to establish the data tunnel with the AP, the BRAS acquires the corresponding second tunnel establishment configuration parameter from the authentication, authorization and accounting device.

Preferably, the first tunnel establishment configuration parameter further includes information about binding between the at least one SSID and at least one VLAN ID.

Because in the prior art, the data tunnel is not separated from the control tunnel, a site VLAN needs to be specially established to describe correspondences between different APs and different BRASs. Otherwise, the BRAS cannot learn from the AC that data is specifically sent from which AP. However, in this embodiment, because the AC notifies the AP of related binding information, no site VLAN needs to be added to distinguish the different APs, thereby simplifying complexity of AP deployment.

It should be noted that when the AP provides multiple SSIDs, in this case, different SSIDs correspond to different VLAN IDs, and according to only the information about binding between the IP address of the at least one AP and the at least one SSID, an operator cannot further process, according to the binding information, a specific corresponding service set belonging to the operator on the BRAS. To enable subsequent refinement control (such as flow measurement control and accounting) of the operator, the first tunnel establishment configuration parameter further includes the information about binding between the at least one SSID and the at least one VLAN ID, so that the operator subsequently performs, according to the information about binding between the at least one SSID and the at least one VLAN ID, refinement control on service sets that correspond to the different SSIDs, and a specific implementation solution of the refinement control is not limited herein. Further, a feasible implementation manner related to verifying, by the BARS, legality of the at least one AP according to the second tunnel establishment configuration parameter is that: the BRAS verifies the legality of the at least one AP according to the information about binding between the IP address of the at least one AP and the at least one SSID, and the information about binding between the at least one SSID and the at least one VLAN ID.

The second tunnel establishment configuration parameter further includes the information about binding between the at least one SSID and the at least one VLAN ID. Optionally, the BARS verifies the legality of the at least one AP according to the information about binding between the IP address of the at least one AP and the at least one SSID, and the information about binding between the at least one SSID and the at least one VLAN ID.

Preferably, the first tunnel establishment configuration parameter further includes at least one tunnel type corresponding to an IP address of each BARS.

The second tunnel establishment configuration parameter further includes at least one tunnel type corresponding to an IP address of each AP.

Figure 7:
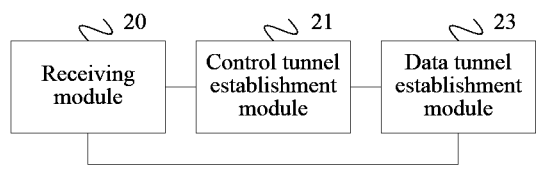
FIG. 7 is a schematic structural diagram of an AP according to an embodiment of the invention.

FIG. 7 is a schematic structural diagram of an AP according to an embodiment of the invention, where the AP can perform the steps of the method shown in FIG. 3. Referring to FIG. 7, the AP includes: a receiving module 20, a control tunnel establishment module 21, and a data tunnel establishment module 23.

The receiving module 20 is configured to receive a first configuration message sent by an AC.

Specifically, the first configuration message includes a first tunnel establishment configuration parameter, and the first tunnel establishment configuration parameter includes information about binding between an IP address of at least one BRAS and at least one SSID.

The control tunnel establishment module 21 is configured to establish a control tunnel with the AC.

The data tunnel establishment module 23 is configured to establish a data tunnel with the at least one BRAS according to the first tunnel establishment configuration parameter.

It should be noted that the AP establishes the data tunnel according to the IP address of the BRAS in the first tunnel establishment configuration parameter, and then for an SSID selected by a user, the AP determines a corresponding data tunnel by performing matching between the SSID and the information about binding between the BRAS and the SSID, and sends data of the SSID to the corresponding BRAS by using the data tunnel.

It should be noted that in this embodiment, the control tunnel establishment module 21 and the data tunnel establishment module 23 may be two independent modules, or may be combined into one module, which is not limited herein.

According to the AP provided by this embodiment, the receiving module receives a first configuration message sent by an AC, where the first configuration message includes a first tunnel establishment configuration parameter, and the first tunnel establishment configuration parameter includes information about binding between an IP address of at least one BRAS and at least one SSID, so that the control tunnel establishment module establishes a control tunnel with the AC; and the data tunnel establishment module establishes a data tunnel with the at least one BRAS according to the first tunnel establishment configuration parameter, thereby separating the data tunnel from the control tunnel, and reducing unnecessary overheads of the AC.

Figure 8:
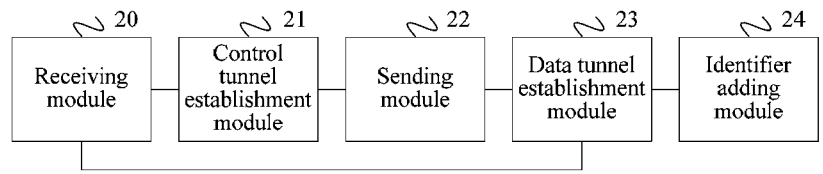
FIG. 8 is a schematic structural diagram of an AP according to an embodiment of the invention.

Based on FIG. 7, FIG. 8 is a schematic structural diagram of an AP according to an embodiment of the invention. Referring to FIG. 8, the AP further includes: a sending module 22 and an identifier adding module 24.

The sending module 22 is configured to send a data tunnel establishment request to the at least one BRAS according to the first tunnel establishment configuration parameter.

Further, based on the fact that the sending module 22 sends the data tunnel establishment request, the receiving module 20 is further configured to receive a data tunnel establishment response message sent by the at least one BRAS, where when security of the AP is successfully verified by the at least one BRAS, the data tunnel establishment response message includes verification success indication information.

Preferably, the data tunnel establishment module 23 is specifically configured to establish the data tunnel with the at least one BRAS according to the verification success indication information and the first tunnel establishment configuration parameter.

Preferably, the first tunnel establishment configuration parameter further includes information about binding between the at least one SSID and at least one VLAN ID.

Because in the prior art, the data tunnel is not separated from the control tunnel, a site VLAN needs to be specially established to describe correspondences between different APs and different BRASs. Otherwise, the BRAS cannot learn from the AC that data is specifically sent from which AP. However, in this embodiment, because the AC notifies the AP of related binding information, no site VLAN needs to be added to distinguish the different APs, thereby simplifying complexity of AP deployment.

The identifier adding module 24 is configured to: after the data tunnel establishment module 23 establishes the data tunnel with the at least one BRAS, when the AP has the information about binding between the at least one SSID and at least one VLAN ID, add a corresponding VLAN ID for user data according to an SSID selected by a user and the information about binding between the at least one SSID and at least one VLAN ID.

The sending module 22 is further configured to send, according to the information about binding between the IP address of the at least one BRAS and the at least one SSID, the user data to a corresponding BRAS by using the data tunnel between the AP and the BRAS.

The first tunnel establishment configuration parameter further includes at least one tunnel type corresponding to an IP address of each BRAS.

Figure 9:
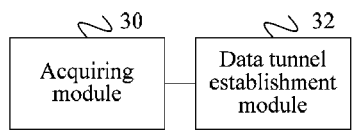
FIG. 9 is a schematic structural diagram of a BRAS according to an embodiment of the invention.

FIG. 9 is a schematic structural diagram of a BRAS according to an embodiment of the invention, where the BRAS may perform the steps of the method shown in FIG. 4. Referring to FIG. 9, the BRAS includes: an acquiring module 30 and a data tunnel establishment module 32.

The acquiring module 30 is configured to acquire a second tunnel establishment configuration parameter.

Specifically, the second tunnel establishment configuration parameter includes information about binding between an IP address of at least one AP and at least one SSID.

The data tunnel establishment module 32 is configured to establish a data tunnel with the at least one AP according to the second tunnel establishment configuration parameter.

According to the BRAS provided by this embodiment, the acquiring module acquires a second tunnel establishment configuration parameter, where the second tunnel establishment configuration parameter includes information about binding between an IP address of at least one AP and at least one SSID; and the data tunnel establishment module establishes a data tunnel with the at least one AP according to the second tunnel establishment configuration parameter, thereby separating the data tunnel from a control tunnel, and reducing unnecessary overheads of the AC.

Further, the acquiring, by the acquiring module 30, a second tunnel establishment configuration parameter in FIG. 9 may be implemented by using any one of the following feasible implementation manners:

manner 1: the acquiring module 30 is specifically configured to receive a second configuration message sent by the access controller, where the second configuration message includes the second tunnel establishment configuration parameter; and manner 2: the acquiring module 30 is specifically configured to acquire the second tunnel establishment configuration parameter from an authentication, authorization and accounting device.

It should be noted that for the manner 2, the AC sends the second tunnel establishment configuration parameter to the authentication, authorization and accounting device in advance. In addition, by means of interaction processes between the AC and the authentication, authorization and accounting device, and between the authentication, authorization and accounting device and the broadband access server in the prior art, a large quantity of protocol modifications caused when the AC directly sends the second configuration message to the broadband access server in the manner 1 are avoided, thereby reducing application costs of the method for establishing a wireless local area network tunnel according to this embodiment of the invention.

Figure 10:
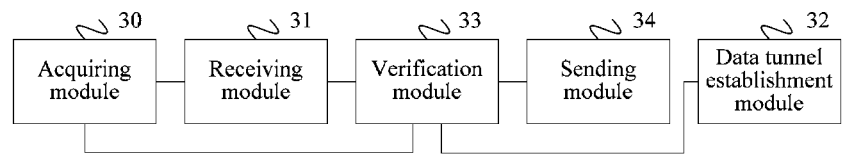
FIG. 10 is a schematic structural diagram of another BRAS according to an embodiment of the invention.

Based on FIG. 9, FIG. 10 is a schematic structural diagram of another BRAS according to an embodiment of the invention. Referring to FIG. 10, the BRAS further includes: a receiving module 31, a verification module 33, and a sending module 34.

The receiving module 31 is configured to receive the data tunnel establishment request sent by the at least one AP.

Further, after the receiving module 31 receives the data tunnel establishment request sent by the at least one AP, the data tunnel establishment module 32 may directly establish the data tunnel with the at least one AP according to the second tunnel establishment configuration parameter, or may perform legality verification on the AP based on the data tunnel establishment request.

Specifically, for a scenario in which the legality verification needs to be performed on the AP, after the receiving module 31 receives the data tunnel establishment request sent by the at least one AP, optionally, the verification module 33 is configured to verify legality of the at least one AP according to the second tunnel establishment configuration parameter.

The sending module 34 is configured to send a data tunnel establishment response message to the at least one AP, where when the at least one AP succeeds in the legality verification, the data tunnel establishment response message includes the verification success indication information.

The data tunnel establishment module 32 is specifically configured to establish a data tunnel with the at least one AP succeeding in the legality verification.

Preferably, the second tunnel establishment configuration parameter further includes the information about binding between the at least one SSID and the at least one VLAN ID.

Because in the prior art, the data tunnel is not separated from the control tunnel, a site VLAN needs to be specially established to describe correspondences between different APs and different BRASs. Otherwise, the BRAS cannot learn from the AC that data is specifically sent from which AP. However, in this embodiment, because the AC notifies the BRAS of related binding information, no site VLAN needs to be added to distinguish the different APs, thereby simplifying complexity of AP deployment.

It should be noted that when the AP provides multiple SSIDs, in this case, different SSIDs correspond to different VLAN IDs, and according to only the information about binding between the IP address of the at least one AP and the at least one SSID, an operator cannot further process, according to the binding information, a specific corresponding service set belonging to the operator on the BRAS. To enable subsequent refinement control (such as flow measurement control and accounting) of the BRAS, the second tunnel establishment configuration parameter further includes the information about binding between the at least one SSID and the at least one VLAN ID, so that the operator subsequently performs, according to the information about binding between the at least one SSID and the at least one VLAN ID, refinement control on service sets that correspond to the different SSIDs, and a specific implementation solution of the refinement control is not limited herein.

The verification module 33 is specifically configured to verify the legality of the at least one access point device according to the information about binding between the IP address of the at least one AP and the at least one SSID, and the information about binding between the at least one SSID and the at least one VLAN ID.

The second tunnel establishment configuration parameter further includes at least one tunnel type corresponding to an IP address of each AP.

Figure 11:
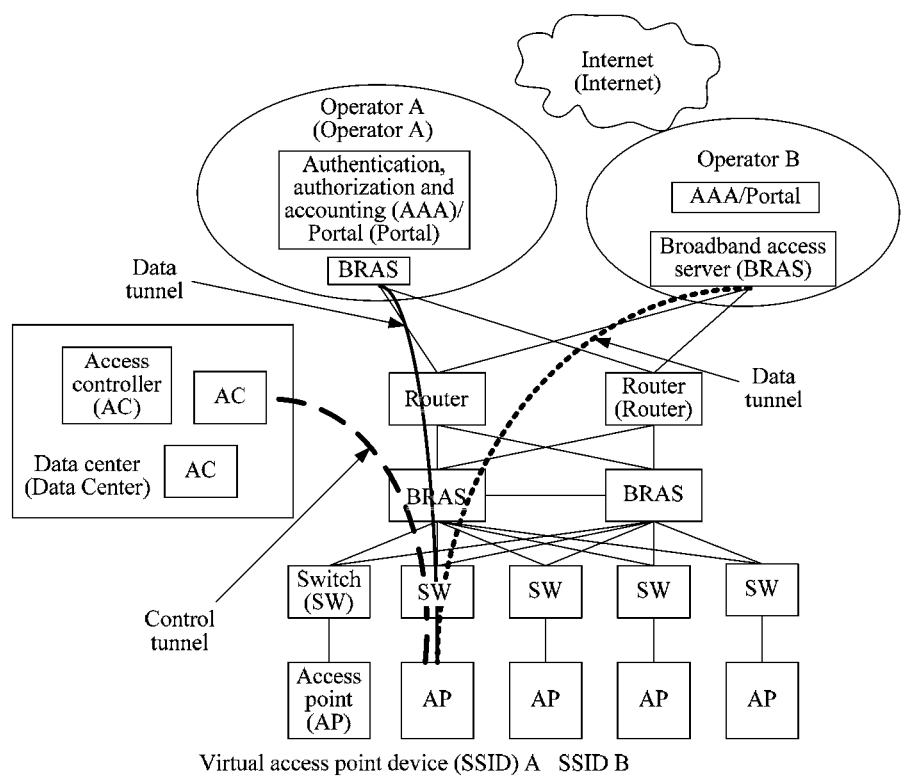
FIG. 11 is a schematic structural diagram of an access network system according to an embodiment of the invention.

FIG. 11 is a schematic structural diagram of an access network system according to an embodiment. It should be noted that FIG. 11 includes devices related to the embodiments of the invention. Other devices shown in FIG. 11 further include a router (Router), a portal device (Portal), and a switch (SW), and specific functions of these device are not described in detail herein. Different BRASs may belong to different operators, for example, FIG. 11 includes two operators: an Operator A and an Operator B. Referring to FIG. 11, the access network system includes: at least one AC, at least one AP, and at least one broadband access server.

The AC may perform the steps of the method shown in FIG. 2, the AP may perform the steps of the method shown in FIG. 3, and the broadband access server may performs the steps of the method shown in FIG. 4.

According to the access network system provided by this embodiment, an AC sends a first configuration message to an AP, where the first configuration message includes a first tunnel establishment configuration parameter, and the first tunnel establishment configuration parameter includes information about binding between an IP address of at least one BRAS and at least one SSID; and the AP establishes a control tunnel with the AC; optionally, an AC sends a second configuration message to a BRAS, where the second configuration message includes a second tunnel establishment configuration parameter; or a BRAS acquires a second tunnel establishment configuration parameter from an authentication, authorization and accounting device, where it should be noted that the AC sends the second tunnel establishment configuration parameter to the authentication, authorization and accounting device in advance, where the second tunnel establishment configuration parameter includes information about binding between an IP address of at least one AP and the at least one SSID; and the BRAS establishes a data tunnel with the at least one AP according to the second tunnel establishment configuration parameter, thereby separating the data tunnel from the control tunnel, and reducing unnecessary overheads of the AC.

Further, because in the prior art, the data tunnel is not separated from the control tunnel, a site VLAN needs to be specially established to describe correspondences between different APs and different BRASs. Otherwise, the BRAS cannot learn from the AC that data is specifically sent from which AP. However, in this embodiment, because the AC separately notifies the AP and the BRAS of the information about binding between the at least one SSID and the at least one VLAN ID, no site VLAN needs to be added to distinguish the different APs, thereby simplifying complexity of AP deployment.

It should be noted that in this embodiment, after the first tunnel establishment configuration parameter and the second tunnel establishment configuration parameter are optimized, the parameters may further include other related information, and the foregoing embodiments of the invention already describes the optimized information, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the embodiments of the invention, but not for limiting the embodiments of the invention. Although the invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the invention.

What is claimed is:

1. A method for establishing a wireless local area network tunnel, the method comprising:
    sending, by an access controller, a first configuration message to at least one access point device to enable the at least one access point device to determine at least one broadband access server,
        wherein the first configuration message comprises a first tunnel establishment configuration parameter for
            binding an Internet Protocol (IP) address of at least one broadband access server and at least one service set identifier, the binding enabling the access point device to establish a data tunnel with the at least one broadband access server according to the IP address and the at least one service set identifier,
adding a virtual local area network identifier for user data associated with the service set identifier according to binding between the service set identifier and the virtual local area network identifier, and
sending the user data to the at least one broadband access server using the data tunnel between the access point device and the broadband access server, according to the binding; and
establishing, by the access controller, a control tunnel with the at least one access point device.

2. The method according to claim 1, further comprising:
sending, by the access controller, a second configuration message to the at least one broadband access server or an authentication, authorization and accounting (AAA) device,
wherein the second configuration message comprises a second tunnel establishment configuration parameter comprising information about binding between an IP address of the at least one access point device and the at least one service set identifier.

3. An access controller comprising:
a processor, and
a memory coupled to the processor and storing computer program instructions which, when executed by the processor perform operations comprising:
sending a first configuration message to at least one access point device for enabling the at least one access point device to determine at least one broadband access server,
wherein the first configuration message comprises a first tunnel establishment configuration parameter for binding an Internet Protocol (IP) address of at least one broadband access server and at least one service set identifier, the binding enabling the access point device to establish a data tunnel with the at least one broadband access server according to the IP address and the at least one service set identifier,
adding a virtual local area network identifier for user data associated with the service set identifier according to binding between the service set identifier and the virtual local area network identifier, and
sending the user data to the at least one broadband access server using the data tunnel between the access point device and the broadband access server, according to the binding; and
establishing a control tunnel with the at least one access point device.

4. The access controller according to claim 3, wherein the operations further comprise:
sending a second configuration message to the at least one broadband access server or an authentication, authorization and accounting (AAA) device,
wherein the second configuration message comprises a second tunnel establishment configuration parameter providing information about binding between an IP address of the at least one access point device and the at least one service set identifier.

5. An access point device comprising:
a processor, and
a memory coupled to the processor for storing computer program instructions which, when executed by the processor, perform operations comprising:

receiving a first configuration message sent by an access controller,
wherein the first configuration message comprises a first tunnel establishment configuration parameter for binding an Internet Protocol (IP) address of at least one broadband access server and at least one service set identifier;
establishing a control tunnel with the access controller;
establishing a data tunnel with the at least one broadband access server according to the first tunnel establishment configuration parameter;
adding a virtual local area network identifier for user data associated with the service set identifier according to binding between the service set identifier and the virtual local area network identifier; and
sending the user data to the at least one broadband access server using the data tunnel between the access point device and the broadband access server, according to the binding between the IP address of the at least one broadband access server and the at least one service set identifier.

6. The access point device according to claim 5, wherein the operations further comprise:
sending a data tunnel establishment request to the at least one broadband access server according to the first tunnel establishment configuration parameter.

7. The access point device according to claim 6, wherein the operations further comprise:
receiving a data tunnel establishment response message sent by the at least one broadband access server,
wherein when security of the access point device is successfully verified by the at least one broadband access server, the data tunnel establishment response message comprises verification success indication information.

8. A broadband access server comprising:
a processor; and
a memory coupled to the processor for storing computer program instructions which, when executed by the processor, perform operations comprising:
acquiring a tunnel establishment configuration parameter providing information about binding between an Internet Protocol (IP) address of at least one access point device and at least one service set identifier;
receiving a data tunnel establishment request sent by the at least one access point device;
verifying legality of the at least one access point device according to the second tunnel establishment configuration parameter;
sending a data tunnel establishment response message to the at least one access point device, wherein the data tunnel establishment response message comprises verification success indication information when the legality of the at least one access point device is verified; and
establishing a data tunnel with the verified at least one access point device to enable the access point device to add a virtual local area network identifier for user data associated with the at least one service set identifier according to binding between the at least one service set identifier and the virtual local area network identifier, and send the user data to the broadband access server using the data tunnel.

9. The broadband access server according to claim 8, wherein the operations further comprise:

receiving a second configuration message sent by an access controller, wherein the second configuration message comprises the second tunnel establishment configuration parameter.

10. The broadband access server according to claim 8, wherein the operations further comprise:
acquiring the second tunnel establishment configuration parameter from an authentication, authorization and accounting (AAA) device.

11. An access network system comprising an access controller, an access point device and a broadband access server, wherein
the access controller is configured to:
send a first configuration message to the access point device,
wherein the first configuration message comprises a first tunnel establishment configuration including binding between an Internet Protocol (IP) address of at least one broadband access server and at least one service set identifier; and
establish a control tunnel with the access point device;
the access point device is configured to:
receive the first configuration message sent by the access controller;
establish the control tunnel with the access controller;
establish a data tunnel with the at least one broadband access server according to the first tunnel establishment configuration parameter;
add a virtual local area network identifier for user data associated with the service set identifier according to binding between the service set identifier and the virtual local area network identifier; and
send the user data to the broadband access server using the data tunnel between the access point device and the broadband access server, according to the binding between the IP address of the at least one broadband access server and the at least one service set identifier; and
the broadband access server is configured to:
acquire a second tunnel establishment configuration parameter providing information about binding between an IP address of at least one access point device and at least one service set identifier; and
establish the data tunnel with the at least one access point device according to the second tunnel establishment configuration parameter.

12. The access network system according to claim 11, wherein the access point device is further configured to:
send a data tunnel establishment request to the at least one broadband access server according to the first tunnel establishment configuration parameter.

13. The access network system according to claim 12, wherein the access point device is further configured to:
receive a data tunnel establishment response message sent by the at least one broadband access server, wherein when security of the access point device is successfully verified by the at least one broadband access server, the data tunnel establishment response message comprises verification success indication information.

14. The access network system according to claim 11, wherein the access point device is further configured to:
send the user data to the broadband access server using the data tunnel between the access point device and the broadband access server, according to the information about binding between the IP address of the at least one broadband access server and the at least one service set identifier.

* * * * *